United States Patent [19]

Gangal et al.

[11] Patent Number: 4,792,594
[45] Date of Patent: Dec. 20, 1988

[54] TETRAFLUOROETHYLENE COPOLYMERS

[75] Inventors: Subhash V. Gangal; Satish C. Malhotra, both of Parkersburg, W. Va.

[73] Assignee: E. I. Du Pont de Nemours and Company, Wilmington, Del.

[21] Appl. No.: 947,847

[22] Filed: Dec. 30, 1986

Related U.S. Application Data

[60] Division of Ser. No. 739,860, May 31, 1985, Pat. No. 4,636,549, which is a continuation-in-part of Ser. No. 663,466, Oct. 18, 1984, abandoned, which is a continuation-in-part of Ser. No. 489,305, Apr. 28, 1983, abandoned, which is a continuation-in-part of Ser. No. 449,499, Dec. 13, 1982, abandoned.

[51] Int. Cl.$^4$ ............................................. C08F 14/18
[52] U.S. Cl. ................................................... 526/253
[58] Field of Search ........................................ 265/253

[56] References Cited

U.S. PATENT DOCUMENTS

| 2,943,080 | 6/1960 | Bro | 526/253 |
| 3,132,124 | 5/1964 | Couture et al. | 526/254 |
| 3,287,339 | 11/1966 | Sianesi et al. | 526/253 |
| 4,123,602 | 10/1978 | Ukihashi et al. | 526/253 |
| 4,530,981 | 7/1985 | Malhotra | 526/253 |

FOREIGN PATENT DOCUMENTS

| 1464332 | 11/1966 | France | 526/253 |
| 2084593 | 4/1982 | United Kingdom | 526/253 |

Primary Examiner—Joseph L. Schofer
Assistant Examiner—N. Sarofim

[57] ABSTRACT

A tetrafluoroethylene copolymer composition in which the modifying comonomer is a fluorinated alkyl ethylene of the formula $CF_3-CF_2-(CF_2)_2-CH=CH_2$.

3 Claims, No Drawings

TETRAFLUOROETHYLENE COPOLYMERS

CROSS REFERENCE TO RELATED APPLICATIONS

This application is a division of application Ser. No. 739,860, filed on May 31, 1985, now U.S. Pat. No. 4,636,549, which in turn is is a continuation-in-part of application Ser. No. 663,466, filed Oct. 18, 1984, now abandoned, which is a continuation-in-part of application Ser. No. 489,305, filed Apr. 28, 1983 now abandoned. It is also a continuation-in-part of application Ser. No. 449,499, filed Dec. 13, 1982, now abandoned.

FIELD OF THE INVENTION

This invention relates to improved tetrafluoroethylene copolymers and dispersions and to processes for preparing them. The polymers contain a small amount of perfluorobutyl ethylene units.

BACKGROUND OF THE INVENTION

It is known in the art that polytetrafluoroethylene can be modified by adding small amounts of comonomers to the polymerization mixture so that the comonomers in polymerized form become part of the resulting copolymer. Two comonomers commonly employed by the art for this purpose are hexafluoropropylene, $CF_3—CF=CF_2$, and perfluoro(propyl vinyl ether), $CF_3CF_2CF_2—O—CF=CF_2$. However, these comonomers, because of the presence of fluorine atoms on the double bond carbons, do not have as fast a polymerization rate as the tetrafluoroethylene monomer. It would be desirable to find a comonomer that would react more quickly in order to increase polymerization rates and to promote incorporation of such amounts of the comonomer.

SUMMARY OF THE INVENTION

A tetrafluoroethylene polymer consisting essentially of polymerized units of tetrafluoroethylene and at least one copolymerizable monomer of the formula

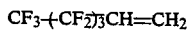

$$CF_3\text{-}(CF_2)_3CH=CH_2$$

present in an amount which does not cause the melt viscosity to be less than about $1\times10^8$ PaS at 380° C., wherein the units of said copolymerizable monomer are located in the interior of the polymer particle.

DESCRIPTION OF THE INVENTION

The polymers of this invention are of high molecular weight as indicated by their inability to be fabricated by melt flow procedures such as melt extrusion or injection molding. Thus they are "non-melt-fabricable", i.e. are not extrudable from a melt. In view of their non-melt-fabricable nature, the copolymers have melt viscosities above $1\times10^8$ PaS measured at 380° C. These very high melt viscosities result primarily from the low amount of comonomer present. For example, the amount of polymerized comonomer units present complementally to the tetrafluoroethylene units will be preferably less than 0.5 percent by weight of total polymer weight and generally less than 0.2%. As a minimum amount present, preferably at least 0.004 or 0.01% of the comonomer will be present. The copolymers include the so-called granular tetrafluoroethylene polymers that are produced by the suspension method which involves the precipitation of the polymer as it is formed. These are called "precipitation produced polymers". The copolymers also include the so-called fine powder tetrafluoroethylene polymers that are produced by the aqueous dispersion method in which the polymer particles remain in a colloidal state in the aqueous polymerization liquor as they are produced. These are called "dispersion produced polymers".

The process used to prepare the dispersion produced polymers of this invention is the dispersion polymerization process. Such polymerization is described in a number of patents such as U.S. Pat. Nos. 3,142,665 or 3,391,099. In brief, tetrafluoroethylene is pressured into an autoclave containing water and conventional free-radical polymerization initiators along with paraffin wax to suppress coagulum formation and an emulsifying agent. The reaction mixture is agitated mildly and the polymerization is carried out at suitable temperatures and pressures. Upon completion of the polymerization, the resulting aqueous dispersion can be used as such, or the dispersed polymer particles can be coagulated by usual techniques known in the art to obtain fine powder tetrafluoroethylene polymer. The comonomer reacts much faster than tetrafluoroethylene monomer and comonomer addition rate is important to the distribution of comonomer achieved in the polymer. The comonomer can be added as a single charge, in which case, the comonomer is found in polymerized form mostly in the core or interior of the polymer particle. The comonomer can also be injected throughout most of the polymerization, but addition must be stopped before the end of the polymerization, e.g., at least 5 to 10% before, to avoid comonomer in the shell or outer portion of the particle.

Particle size in the dispersion can be controlled by known procedures. For example, addition of dispersing agent can be programed as described in U.S. Pat. No. 3,391,099 to obtain the desired particle size.

The polymerization temperature will oridinarily be between 50°–110° C. and the initiator will be a peroxide or persulfate. A buffer to maintain pH at between 6–9 may be used if desired. Agitation will be mild, so that no coagulation of polymer particles occur. If desired following polymerization, the dispersed particles can be coagulated by mechanical agitation.

The dispersion produced polymers of this invention have high melt viscosities and are suitable in dispersion form as coating material, as for example onto glass fabric. Paste extruded polymer is useful in making tubing, unsintered tape, and wire and cable insulation.

The process used to prepare the precipitation produced polymers of this invention is the usual suspension polymerization process used to prepare the so-called granular polytetrafluoroethylene. Such polymerization is described in a number of patents such as U.S. Pat. Nos. 3,245,972 and 3,855,191. In brief, tetrafluoroethylene is pressured into an autoclave containing water and conventional free-radical polymerization initiators along with optionally buffer and optionally a small amount (up to about 200 ppm based on $H_2O$) of an emulsifying agent. The reaction mixture is agitated and the polymerization is carried out at suitable temperatures and pressures. Upon completion of the polymerization, the polymer is isolated and dried. The comonomers may be added as a precharge, or throughout a portion of the polymerization but not to the end of the reaction, in order to obtain a polymer that contains comonomer units only in the interior (core) of the polymer particles.

The polymerization temperature will ordinarily be between 50°–120° C. and the initiator will be a peroxide or persulfate. Inorganic persulfates, such as ammonium persulfate, are preferred. A buffer to maintain pH at between 6–9 may be used if desired. In addition, a small amount of a dispersing agent (e.g. up to 100 or 200 ppm based on water present) may be employed in order to increase the surface area of the resulting polymer particles. Agitation will be sufficient to ensure coagulation of the polymer particles as the polymerization proceeds.

The precipitation produced polymers of this invention have such high melt viscosities that they are suitable for preparing billets (Billets are useful to skive into tapes or sheets). The polymers also exhibit high dielectric strength which makes them useful for electrical grade skived tape; exhibit low deformation under load which makes them useful for gaskets; exhibit high flexural strength which makes them useful for bellows and membranes; and exhibit low gas permeability which makes them useful for chemical lining and diaphragms.

A distinction must be made between the polymers of this invention (which contain only very low amounts of comonomer) and tetrafluoroethylene polymers having a higher content of comonomer. The latter contain enough comonomer to permit them to be processed from a melt by extrusion methods customary for thermoplastics, and thus their melt viscosities are far below the $1 \times 10^8$ PaS minimum of the copolymers of this invention. The polymers of this invention, like unmodified polytetrafluoroethylene itself, belong to the type of tetrafluoroethylene polymers that are not extrudable from a melt because they cannot be melted, and special molding methods must be used to fabricate them.

The dispersion produced polymers of this invention have a morphology which differs from that of the precipitation produced polymers. The former are produced in the presence of such high amounts of emulsifier that, after polymerization has ended, they remain in colloidal distribution in the aqueous medium. This causes them, for reasons that are unclear, to be filbrillated when they are extruded as a paste. The precipitation produced polymers on the other hand cannot be paste extruded. They must be ram extruded or mold-sintered.

Properties of the polymers obtained in the Examples which follow are determined according to the procedures set forth below:

(1) Determination of Comonomer Content

For dispersion produced polymers the comonomer content was determined by infrared spectroscopy. Films were pressed at room temperature and a Perkin Elmer 283B infrared spectrophotometer was used to determine the absorption of the $CH_2$ bending at 876 $cm^{-1}$.

For precipitation produced polymers the comonomer content in the copolymers was determined by Fourier Transform (FT) IR spectroscopy. Ten mil cold pressed films were prepared and spectra were obtained on Nicolet 7000 FT IR spectrophotometer at a resolution of 4 $cm^{-1}$. The —$CH_2$— bending vibration at 880 $cm^{-1}$ was used, calibrated using NMR analysis. The absorbance at 880 $cm^{-1}$ was calculated by taking the difference between absorbances at 888 and 880 $cm^{-1}$. For perfluorobutyl ethylene (PFBE) comonomer, the calculation used is as follows $$\text{Wt. \% PFBE} = \frac{A\ 880\ cm^{-1} - (0.00064 \times t) \times 100}{t \times 0.97}$$

where t=Thickness in mils and A=absorbance.

(2) Standard Specific Gravity (SSG)

Standard specific gravity (SSG) of the molding powder is measured by water displacement of a standard molded test specimen in accordance with ASTM D1457-69. The standard molded part is formed by preforming 12.0 g. of the molding powder in a 2.86 cm. diameter die at a pressure of 34.48 and 6.90 MPa (352 and 70.4 kg/cm²), followed by the sintering cycle of the preform of heating from 300° to 380° C. at 2° C./min., holding at 380° C. for 30 minutes, cooling at 295° C. at 1° C./min. and holding at this temperature for 25 minutes, after which the specimen is cooled to room temperature and tested for specific gravity.

(3) Specific Surface Area (SSA)

SSA was measured by a "Quantasorb" surface area analyzer. The measurement was made on raw polymer obtained directly from the polykettle vessel after washing and drying.

(4) Melt Viscosity

Melt viscosity is calculated by measuring the tensile creep of a sintered piece held at 380° C. Specifically, 12 g. of molding powder is placed in a 7.6 cm. diameter mold between 0.152 cm. rubber cauls and paper spacers. Pressure is then slowly applied on the mold until a value of 40.5 kg./cm.² is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C./minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar over where the 4 cm. test length is brought to a temperature of 380°±2° C. A weight is then attached to the bottom quartz rod to give a total weight suspended from the sample sliver of about 4 g. The elongation measurements vs. time are obtained, and the best average value for the creep curve in the interval between 30 and 60 minutes is measured. The melt viscosity is then calculated from the relationship $\eta_{app} = (WL_t g)/3(dL_t/dt)A_T$ wherein $\eta_{app}$=(apparent) melt viscosity in shear, poises W=tensile load on sample, g $L_t$=length of sample (at 380° C.) cms. (4.32 cm)

g=gravitational constant, 980 cm./sec.²

$(dL_t/dt)$=rate of elongation of sample under load=-slope of elongation vs. time plot, cm./sec.

$A_T$=cross-sectional area of sample (at 380° C.), cm²—area increases 37% at 380° C. over that at room temperature (5) Average Dispersion Particle Size The average dispersion particle size was determined from the absorbance (scattering) of a dilute aqueous sample at 546 millimicron using a Beckman DU Spectrophotometer.

(6) Dielectric Strength

Dielectric strength was measured by preforming 140 g powder into a 5.6 cm diameter molding and sintering at 380° C. for 3½ hours, heating at 6° C./min from 290° to 380° C. and cooling at 1° C./min from 380° C. to 290° C. The measurement was made on 5-ml tape using Beckman Model PA5 AC Dielectric Strength Test Set.

(7) TGA

TGA was obtained using a Du Pont 951 TGA Analyzer. The weight loss was determined at a constant temperature for 2 and 4 hr. (negative weight loss actually indicated wt. again.)

(8) Tensile Strength and Elongation

Tensile strength and elongation were measured in accordance with ASTM D-1475-69.

(9) Thermal Instability Index (TII)

TII was measured according to the procedure specified in ASTM Designation D-1457-81a, pt. 36, p. 111, May 1982, Standard Specification for PTFE Molding and Extrusion Materials.

(10) Rheometric Pressure

These values were measured by the method of ASTM D1457, Sec. 12.8.

EXAMPLES

Example 1

Dispersion Produced Polymer

The following polymerization was conducted: a horizontally disposed, water/stream jacketed, cylindrical, stainless steel autoclave, located in a barricade and having a capacity of 36,250 cc and a length-to-diameter ratio of about 1.5 to 1, and provided with a 4-bladed, cage-type agitator capable of being rotated at 46 rpm and running the length of the autoclave, was evacuated, and then charged with 855 g of paraffin wax, 21.8 kg of demineralized water, and 30 g of ammonium perfluorocaprylate (C-8, APFC) dispersing agent and 15 g of disuccinic acid peroxide and 0.1 g ammonium persulfate. The autoclave was then heated to 65° C., evacuated and purged with nitrogen. It was then agitated at 46 rpm, heated to 90° C. and the vessel was then pressured with tetrafluoroethylene to 26.1 kg/cm² absolute. When kick off occurred, as evidenced by 1.4 kg/cm² drop in pressure, injection of perfluorobutylethylene (PFBE) at 0.25 ml/min was begun, and continued until 5.9 kg of tetrafluoroethylene had reacted. Then an additional 5.9 kg of tetrafluoroethylene was reacted, tetrafluoroethylene pressure was increased to 28.2 kg/cm² right after PFBE injection began. This pressure was maintained and the polymerization temperature was 90° C. After a total of 11.8 kg tetrafluoroethylene was polymerized, the autoclave was vented. The time from kick off to vent was 93 minutes.

The resulting dispersion was discharged from the autoclave, cooled, and the supernatant wax was removed. The dispersion was about 35.6% solids and had a raw dispersion average particle size of 0.150 μm.

The dispersion was diluted to 15% solids with demineralized water, made basic with ammonia and agitated vigorously until it coagulated. After coagulation it was agitated for an additional 7 minutes and then dried at 150° C.

Since the perfluorobutylethylene is rapidly incorporated into the polymer, and perfluorobutylethylene addition stopped after half of the tetrafluoroethylene had been polymerized, a shell-core particle having the comonomer primarily in the core or interior is obtained. The product had an SSG of 2.166, a melt creep viscosity of $8.9 \times 10^{10}$ poises, a surprisingly low TII of 6.7, and 0.15 wt. % PFBE. Its extrusion pressure was 911 kg/cm² at 1600:1 reduction ratio. An unsintered tape made by calendaring a lubricated paste extrudate was uniform in width and had smooth edges.

EXAMPLE 2

Dispersion Produced Polymer

The procedure of Example 1 was followed except that the initiators were 5 g of disuccinic acid peroxide and 0.40 g ammonium persulfate, polymerization was at 75° C., only 3 g of C-8 surfactant was charged initially and the remaining 27 g in 1000 ml of DM water was charged after 0.9 kg of TFE rected. (The initial water charge was reduced by 0.9 kg to compensate for this water charged with the C-8.) Also perfluorobutylethylene addition was stopped after 10.5 kg of TFE reacted. A total of 44.5 g of perfluorobutylethylene and 11.8 kg of TFE were added during the reaction time of 165 minutes.

The dispersion had an RDPS of 0.178 μm and the coagulated product had a SSG of 2.146, a melt creep viscosity of $7.7 \times 10^{10}$ poises, and a TII of 9.6, and 0.38 wt. % PFBE. The extrusion pressure was 856 kg/cm² (1600:1 reduction ratio). The resin is suitable for wiring coating.

The PFBE is present only in the interior of the particle.

EXAMPLE 3

Dispersion Produced Polymer

The procedure of Example 1 was followed except the initiator was 30 g of disuccinic acid peroxide and 0.44 g iron was added. Also 2 g of C-8 APFC dispersant was charged to the autoclave initially followed by 28 g additional C-8 APFC after 0.9 kg of tetrafluoroethylene had reacted. The perfluorobutylethylene, 29 g, was all charged to the autoclave before it was pressured up with tetrafluoroethylene.

The dispersion had a RDPS of 0.179 μm and the coagulated product had an SSG of 2.152, a melt creep viscosity of $9.6 \times 10^{10}$ poises, and its extrusion pressure was 813 kg/cm, and it had 0.25 wt. % PFBE. The PFBE units were present in the interior but not in the outer portion of the particle.

COMPARISON EXAMPLES

Dispersion Produced Polymer

The extrusion pressures of the polymer Examples 1-3 (where no perfluorobutyl ethylene (PFBE) units are present in the shell or outer portion of the polymer particle) were 911 kg/cm, 856 kg/cm, 813 kg/cm (1600:1 reduction ratio) respectively. In contrast, when PFBE addition was continued until polymerization ceased (i.e., where particles having PFBE units in the outer shell of the particle were produced), extrusion pressures were much lower. This is shown by the following comparisons.

COMPARISON A

The procedure of Example 1 was essentially repeated except initiator, 0.30 g of ammonium persulfate was charged after TFE monomer pressure up, only 3 g of C-8 APFC dispersant was initially charged and a reaction temperature of 80° C. was used. An additional 27 g of C-8 APFC dissolved in 1000 ml of demineralized water was pumped in after 0.9 kg tetrafluoroethylene reacted. (The initial water charge was reduced by 0.9 kg to compensate for the water pumped with the C-8 APFC). The perfluorobutylethylene addition was begun during pressure up with tetrafluoroethylene and continued at a rate of 0.25 ml/min until tetrafluoroethylene feed ceased. A total of 11.8 kg of tetrafluoroethylene and 27.8 g of perfluorobutylethylene was added. The reaction time was 73 minutes.

The dispersion from this example had 0.24 wt. % PFBE, an RDPS of 0.206 $\mu$m and the coagulated product had a SSG of 2.146, a melt creep viscosity of $9.3 \times 10^{10}$ poises and a TII of 12.6. The extrusion pressure was 649 kg/cm$^2$ (1600:1 reduction ratio).

COMPARISON E

The procedure of Example 2 was followed except all the C-8 APFC (30 g) was charged initially, and the perfluoroethylene addition was continued until tetrafluoroethylene feed was stopped.

The dispersion had a RDPS of 0.147 $\mu$m and the coagulated product had an SSG of 2.143, a melt creep viscosity of $11.2 \times 10^{10}$ poises, and a TII of 10.7. As expected for the more uniform distribution of comonomer throughout the particle, the extrusion pressure of 740 kg/cm$^2$ (1600:1 reduction ratio) was lower than in Example 2.

COMPARISON C

The procedure of Example 3 was followed except that perfluorobutylethylene was added continuously at 0.20 ml/min from tetrafluoroethylene pressure up until the tetrafluoroethylene feed valve was closed. Also the initial C-8 APFC charge was 10 g and an additional 20 g, dissolved in 1000 ml of demineralized water, was added after 0.9 kg of tetrafluoroethylene had been added.

The dispersion had a RDPS of 0.153 $\mu$m and the coagulated product had an SSG of 2.158, a melt creep viscosity of $9.6 \times 10^{10}$ poises, and the very low extrusion pressure of 444 kg/cm$^2$ (1600:1 reduction ratio).

EXAMPLE 4

Dispersion Produced Polymer

The following polymerization was conducted: A horizontally disposed, water/steam jacketed, cylindrical, stainless steel autoclave, located in a barricade and having a capacity of 36,250 ml and a length-to-diameter ratio of about 1.5 to 1, and provided with a 4-bladed agitator running the length of the autoclave, was charged with 21.4 kg of demineralized water 600 g of paraffin wax, and 30 g of ammonium perfluorocaprylate (C-8, AFPC) dispersing agent. At a temperature of 65°-75° C. the autoclave was evacuated and purged with nitrogen, and 10 ml (15 g) of perfluorobutylethylene was precharged. The autoclave was agitated and pressured to 28.2 kg/cm$^2$ (400 psig), heated to 90° C., and 10 g of disuccinic acid peroxide plus 0.10 g of ammonium persulfate dissolved in 500 ml of demineralized water was added over a 5.5 min period. After kickoff, as evidenced by a 1.4 kg/cm$^2$ pressure drop, the pressure was maintained at 28.2 kg/cm$^2$ until 11.8 kg of TFE reacted, and then the autoclave was vented. The time from kick-off to vent was 61 min.

The resulting dispersion was discharged from the autoclave, cooled, and the supernatant wax was removed. The dispersion was 34.3% solids and had a raw dispersion particle size of 0.130 $\mu$m.

The dispersion was diluted to 15% solids with demineralized water, made basic with ammonia and agitated vigorously until it coagulated. After coagulation it was agitated for an additional 7 minutes and then dried at 150° C.

The resin had a standard specific gravity of 2.154 and a PFBE content by infrared analysis of 0.13%, indicating that all the PFBE had been incorporated in the core or interior of the polymer. The extrusion pressure was over 980 kg/cm$^2$ (at 1600:1 reduction ratio).

EXAMPLE 5

Dispersion Produced Polymer

The procedure of Example 4 was repeated except that after 9.1 kg of TFE had reacted, the autoclave was vented to 0.07 kg/cm$^2$ and then repressured with TFE to 28.1 kg/cm$^2$. An additional 2.7 kg of TFE was reacted and the autoclave was vented.

The resin had a standard specific gravity of 2.158 and a PFBE content by infrared analysis of 0.13%, indicating that all the PFBE had been incorporated in the core of the polymer. This also shows that the PFBE in Example 1 was all incorporated before the final 2.7 kg of polymer was formed. The extrusion pressure was over 980 kg/cm$^2$ (at 1600:1 reduction ratio).

EXAMPLE 6

Dispersion Produced Polymer

The procedure of Example 4 was followed but with the following changes:

Only 5 g of the C-8 APFC fluorosurfactant was added in the initial water charge, and the remaining 27 g was dissolved in 1000 ml of dimineralized water and added at 50 ml/min after 1.8 kg of TFE had reacted.

The initial water charge was 20.9 kg and the initiator was added in two portions: 0.1 g APS plus 1.2 g DSP in 250 ml of demineralized water was added over a 5 min. period after TFE pressure up, and 0.23 g APS plus 2.6 g DSP in 570 ml of demineralized water was added over a 29 min. period starting after 6.8 kg of TFE had reacted.

The polymerization Pressure was 21.1 kg/cm$^2$ (300 psig).

The dispersion had a raw dispersion particle size of 0.179 $\mu$m, and the coagulated and dried resin had a standard specific gravity of 2.156. The extrusion pressure was 780 kg/cm$^2$ (at 1600:1 reduction ratio).

EXAMPLE 7

Dispersion Produced Polymer

The procedure of Example 6 was followed except that all 30 g C-8 APFC fluorosurfactant was added in the initial water charge, and the initiators were added in two portions: (1) 0.1 g APS plus 1.2 g DSP in 250 ml of demineralized water added after TFE pressure up and (2) 0.12 g APS plus 1.4 g DSP in 300 ml of demineralized water was added beginning from kickoff over a 30 min. period. The polymerization pressure was 28.2 kg/cm$^2$.

The dispersion had a raw dispersion particle size of 0.139 $\mu$m and the coagulated resin had a standard specific gravity of 2.155. The extrusion pressure was over 980 kg/cm$^2$ (at 1600:1 reduction ratio).

EXAMPLE 8

Dispersion Produced Polymer

The procedure of Example 7 was followed except that 0.69 g of methanol was charged with the initial charge of initiator and after kickoff initiator solution containing 0.22 g APS, 2.5 g DSP, and 0.28 g of methanol in 550 ml of demineralized water was added at 10 ml/min until a total of 11.8 kg of TFE had reacted and the batch was complete.

The dispersion had a raw dispersion particle size of 0.127 m and the coagulated resin had a standard specific gravity of 2.193. The extrusion pressure was 960 kg/cm$^2$ (at 1600:1 reduction ratio).

EXAMPLE 9

Precipitation Produced Polymer

A 38-liter polykettle vessel was charged with 21.8 kg of demineralized water, 0.30 g (13.8 ppm) ammonium perfluorooctanoate (APFC) dispersant, and 3.0 g ammonium persulfate (APS) initiator. The contents of the vessel were heated to 65° C. and evacuated. The vessel was agitated with a 2-blade 45° pitch agitator at 600 RPM. One ml perfluorobutylethylene (PFBE) was injected into the vessel with a syringe. Tetrafluoroethylene (TFE) was then added to the vessel until the pressure was 1.72×10$^6$ Pa. After the polymerization began, as evidenced by a drop in pressure, TFE was added to maintain the pressure at 1.72×10$^6$ Pa and an additional 8 ml PFBE was continuously added with a microfeeder at the rate of 0.1 ml per min. Thus PFBE addition was stopped before the end of the reaction and PFBE appears only in the interior of the particles. After the desired amount of TFE had been added, the feed was stopped and the mixture was allowed to react down to 5.5×10$^4$ Pa pressure. Reaction time was 145 minutes. 8.2 kg TFE was polymerized. After venting and evacuation, the pressure in the vessel was brought back to atmospheric with nitrogen and the contents cooled to below 50° C. The polymer was discharged from the vessel and the adhesions were separated. The polymer was cut to less than 0.03 mm average particle size.

The polymer properties are given in Table 1.

EXAMPLES 10-13

Example 9 was repeated with the following ingredient amounts. The polymer properties are given in Table 1.

|  | Ex. 10 | Ex. 11 | Ex. 12 | Ex. 13 |
|---|---|---|---|---|
| APFC, g | 0.30 | 0.30 | 0.30 | 0.10 |
| APS, g | 0.75 | 3.0 | 2.0 | 1.0 |
| PFBE Precharge, ml | 0 | 0.5 | 1.0 | 1.0 |
| PFBE Microfed, ml | 5.1 | 4.2 | 8.0 | 1.0 |
| Microfeeder Rate, ml/min | 0.1 | 0.06 | 0.1 | 0.02 |
| TFE Reacted, kg. | 6.0 | 8.2 | 6.2 | 8.2 |
| Reaction Time, min | 122 | 69 | 123 | 85 |

TABLE 1
PHYSICAL PROPERTIES OF POLYMERS

|  | Ex. 9 | Ex. 10 | Ex. 11 | Ex. 12 | Ex. 13 |
|---|---|---|---|---|---|
| % PFBE by Wt. | 0.12 | 0.10 | 0.01 | 0.24 | 0.01 |
| SSG measured at 34.48 M Pa | 2.174 | 2.165 | 2.175 | 2.163 | 2.162 |
| SSG measured at 6.90 M Pa | — | 2.161 | 2.175 | 2.162 | 2.159 |
| SSA, m$^2$/g (Raw Polymer) | — | — | — | 4.5 | 3.5 |
| Melting Point, °C. | 345 | 347 | 345 | 343 | 346 |
| Melt Viscosity, PaS* | 0.6 × 10$^9$ | 0.6 × 10$^9$ | 1.0 × 10$^9$ | 1.6 × 10$^9$ | 4.0 × 10$^9$ |
| Dielectric Strength v/mil (Preform Press, M Pa) | 1755 (34.48) | 1570 (34.48) | — | 1789 (13.8) | 1860 (13.8) |
| TGA (% Wt Loss at 377° C.) | −0.5/2 hr | — | — | — | 0/4 hr |
| Tensile Strength, MPa (measured at 6.90 MPa preform pressure) | — | 32.9 | — | — | — |
| Elongation, % | — | 449 | — | — | — |
| Ram Extrusion of 6 mm Rod at 6 m/hr: |  |  |  |  |  |
| Tensile Strength, M Pa | — | — | 19.3 | — | — |
| Elongation, % | — | — | 298 | — | — |

COMPARISON D—COMPARISON WITH EXAMPLE 9

Properties of the copolymer of Example 9 were compared with a copolymer made of tetrafluoroethylene and pefluoro(propyl vinyl ether) (PPVE). This comparison copolymer was prepared according to the procedure used to prepare the copolymer of Example 9. The ingredients and other relevant process data were as follows:

| APFC, g | 0.3 |
|---|---|
| APS, g | 0.65 |
| PPVE, Precharge, Ml | 0.5 |
| PPVE Microfed, Ml | 10 |
| Microfeeder Rate, ml/min | 0.1 |
| TFE reacted, kg | 7.7 |
| Reaction Time, min | 140 |

Property data of this PPVE Modified tetrafluoroethylene copolymer is compared with that of the Example 9 copolymer as follows:

TABLE 2

|  | Example 9 | Comparative Example D |
|---|---|---|
| % Comonomer by Wt. | 0.12 PFBE | 0.08 PPVE |
| SSG at preform Pressure 34.48 M Pa | 2.174 | 2.173 |
| Melting Point, °C. | 345 | 347 |
| Melt Viscosity, Pa.S. | 0.6 × 10$^9$ | 1.1 × 10$^8$ |
| Dielectric Strength, v/mil (Preform Press, M Pa) | 1755 (34.48) | 1700 (34.48) |

TABLE 2-continued

|  | Example 9 | Comparative Example D |
|---|---|---|
| TGA (% Wt loss at 377° C.) | −0.5/2 hr (wt. gain) | 0/2 hr |

It is seen from this data that melt viscosity of the PPVE-modified polymer (comparative example) is lower than that for the PFBE-modified resin of Example 1, even through SSG is virtually the same. A high melt viscosity for the molding resins is desired for heavy billets to retain shape at sintering temperatures.

COMPARISON E-COMPARISON WITH EXAMPLE 10

A copolymer was prepared by reacting tetrafluoroethylene and hexafluoropropylene (HFP) following the procedure of Example 9, except that APS used was 0.70 g, C-8 used was 0.30 g, HFP was precharged only (=13 g); temp=60° C. The amount of copolymerized HFP in the copolymer was 0.07% by weight. The HFP modified copolymer was compared with the copolymer of Example 10 for thermal stability, with the following results:

|  | PFBE-Modified Copolymer | HFP-Modified Copolymer |
|---|---|---|
| Thermal Instability Index (TII) - ASTM Method D-1457 | 4 | 25 |
| % Wt. Loss in $N_2$ at 370° C./3 hr | 0.0059 | 0.0084 |

Low TII means better stability. Thus, it is seen that the PFBE-modified copolymer of this invention is more thermally stable.

COMPARISON F-COMPARISON WITH EXAMPLE 9

160 g plaque moldings of 5.6 cm diameter of the polymers of Example 9 and a sample like Comparison D (PPVE), but different in that it was prepared on manufacturing scale with modified recipe, with PPVE precharged only (mv=1.6×10$^8$ Pa S), were sintered at 380° C. for 5 hours in air with a 4.8 kg weight that covered the plaque on top of each of the moldings. The sintered moldings had the following dimensions:

|  |  | Example 9 | Sample like Comparison D |
|---|---|---|---|
| Avg. | Thickness, cm | 3.1 | 2.7 |
|  | Top Diameter, cm | 5.5 | 5.8 |
|  | Bottom Diameter, cm | 5.6 | 5.7 |

The molding of Example 9 was normal in appearance, while the molding of the comparison was significantly distorted. The thickness of the comparison (2.7 cm) is smaller than that before sintering (2.85 cm) in spite of the growth normally experienced during sintering. The diameter (5.7–5.8 cm) is generally larger than that before sintering (5.7 cm) in spite of the shrinkage normally experienced during sintering.

We claim:

1. A tetrafluoroethylene polymer consisting essentially of polymerized units of tetrafluoroethylene and from 0.004% to less than 0.5 percent by weight of total polymer weight of a copolymerizable monomer of the formula $CF_3-(CF_2)_3-CH=CH_2$ present in an amount which does not cause the melt viscosity to be less than about $1 \times 10^8$ PaS at 380° C.

2. A tetrafluoroethylene polymer in the form of a fine powder consisting essentially of polymerized units of tetrafluoroethylene and from 0.004% to less than 0.5 percent by weight of total polymer weight of a copolymerizable monomer of the formula $CF_3-(CF_2)_3-CH=CH_2$ present in an amount which does not cause the melt viscosity to be less than about $1 \times 10^8$ PaS at 380° C., wherein said powder particles have been prepared by polymerization comprising the step of stopping the addition of said copolymerizable monomer at least 5%, based on 100% monomer to polymer conversion, before the end of the polymerization.

3. A tetrafluoroethylene polymer in the form of granular material consisting essentially of polymerized units of tetrafluoroethylene and from 0.004% to less than 0.5 percent by weight of total polymer weight of a copolymerizable monomer of the formula $CF_3-(CF_2)_3-CH=CH_2$ present in an amount which does not cause the melt viscosity to be less than about $1 \times 10^8$ PaS at 380° C.

* * * * *